United States Patent
Kim et al.

(10) Patent No.: US 9,899,671 B2
(45) Date of Patent: Feb. 20, 2018

(54) METHOD FOR PREPARING METAL OXIDE NANOPARTICLE/GRAPHENE COMPOSITE USING SUPERCRITICAL FLUID AND METAL OXIDE NANOPARTICLE/GRAPHENE COMPOSITE PREPARED BY THE SAME

(71) Applicant: Research & Business Foundation SUNGKYUNKWAN UNIVERSITY, Suwon-si (KR)

(72) Inventors: Jaehoon Kim, Seongnam-si (KR); Do Hyeon Yoon, Suwon-si (KR); Wenying Li, Suwon-si (KR); Ji Eun Hwang, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 119 days.

(21) Appl. No.: 14/877,146

(22) Filed: Oct. 7, 2015

(65) Prior Publication Data

US 2016/0099466 A1    Apr. 7, 2016

(30) Foreign Application Priority Data

Oct. 7, 2014 (KR) .................. 10-2014-0134752

(51) Int. Cl.
| | |
|---|---|
| C01B 31/02 | (2006.01) |
| C01B 31/04 | (2006.01) |
| B82Y 40/00 | (2011.01) |
| H01M 4/583 | (2010.01) |
| H01M 4/36 | (2006.01) |
| H01M 4/485 | (2010.01) |
| H01M 10/052 | (2010.01) |

(52) U.S. Cl.
CPC ........... *H01M 4/366* (2013.01); *H01M 4/485* (2013.01); *H01M 4/583* (2013.01); *H01M 10/052* (2013.01)

(58) Field of Classification Search
CPC ...... H01M 4/366; H01M 4/485; H01M 4/583; H01B 1/04; C01B 31/02
USPC ......................... 252/506, 507, 508
See application file for complete search history.

(56) References Cited

U.S. PATENT DOCUMENTS

2013/0302690 A1* 11/2013 Kim ..................... H01M 4/366
                                                                429/231.1

FOREIGN PATENT DOCUMENTS

KR    10-2012-0071840 A    7/2012

OTHER PUBLICATIONS

Haldorai ("Nano ZnO@reduced graphene oxide composite for high performancesupercapacitor: Green synthesis in supercritical fluid." Electrochimica Acta 120, pp. 65-72, online Dec. 24, 2013).*
Park, Sungjin, et al.. "Chemical methods for the production of graphenes." Nature nanotechnology 4.4 (2009: 217-224.
Geim, Andre Konstantin. "Graphene: status and prospects." science 324.5934 (2009): 1530-1534.
Allen, Matthew J., et al. "Honeycomb carbon: a review of graphene." Chemical reviews 110.1 (2009): 132-145.

* cited by examiner

Primary Examiner — Tri V Nguyen
(74) Attorney, Agent, or Firm — NSIP Law

(57) ABSTRACT

Provided herein is a method for preparing a metal oxide nanoparticle/graphene composite using a supercritical fluid and the metal oxide nanoparticle/graphene composite prepared thereby, the method including preparing a dispersed solution by dispersing graphene oxide and a metal oxide precursor in an organic solvent and forming the metal oxide nanoparticle/graphene composite by reacting the dispersed solution under a supercritical condition, thereby uniformly dispersing the metal oxide nanoparticles on a graphene sheet.

12 Claims, 13 Drawing Sheets

METHOD FOR PREPARING METAL OXIDE NANOPARTICLE/GRAPHENE COMPOSITE USING SUPERCRITICAL FLUID AND METAL OXIDE NANOPARTICLE/GRAPHENE COMPOSITE PREPARED BY THE SAME

CROSS-REFERENCE TO RELATED APPLICATION

This application claims the benefit of priority under 35 U.S.C. §119(a) of Korean Patent Application No. 10-2014-0134752, filed on Oct. 7, 2014, in the Korean Intellectual Property Office, the entire disclosure of which is incorporated herein by reference for all purposes.

FIELD

The present invention relates to a method for preparing a metal oxide nanoparticle/graphene composite using a supercritical fluid and the metal oxide nanoparticle/graphene composite prepared by the method, and more particularly, to a method for preparing a metal oxide nanoparticle/graphene composite capable of uniformly dispersing the metal oxide nanoparticles on a graphene sheet using a supercritical fluid, and the metal oxide nanoparticle/graphene composite prepared by the method.

BACKGROUND

Graphene is a material with a thickness of a single atom consisting of carbon atoms arranged in a hexagonal lattice shape on a two-dimensional plane. It is a material receiving huge attention from various fields due to its remarkable characteristics such as an excellent electrical mobility, thermal conductivity, mechanical strength, transparency quantized in terms of thickness, and high specific surface area (Park et al., Nature Nanotechnology, 2010, 4, 217-224; Geim, Science, 2009, 324, 1530-1534; Allen et al., Chemical Reviews, 2010, 110, 132-145).

Graphene may be applied to various fields such as automobile, energy, marine, aerospace, construction, electronic products, medicine, military, and communication, as a next generation energy storage material, semiconductor material alternative to silicon, super capacitor, light weight structural parts, electromagnetic shielding material, sensor, display, and the like.

In order to produce commercial-scale graphene in various application fields, a method of producing graphene oxide from graphite and then reducing the graphene oxide back to graphene is currently being investigated. The modified Hummers method is most widely used as the method for producing graphene oxide from graphite.

Methods being used for reducing graphene oxide back to graphene include a method of using a very toxic reducing agent such as hydrazine or dimethyl hydrazine, a heat treatment method of heating a graphene oxide under a reducing atmosphere at 1,000° C. or higher to remove oxygen, a method of partially removing oxygen from the surface of the graphene oxide using relatively weak reducing agents such as ascorbic acid, and a reducing method using an eco-friendly high efficient supercritical alcohols that have started to be researched recently.

Metal oxide nanoparticles are being used in various industrial fields such as electronic materials, catalysts, sensors, inks, and secondary battery electrode materials using their optical, electrical, magnetic, and chemical characteristics that change when the size of the metal oxide is reduced to nano size.

As the method for preparing metal oxide nanoparticles, gas evaporation-condensation methods or methods using ball milling, which have drawbacks of high cost and low efficiency have been mostly used. Furthermore, as the chemical preparing method, a method of preparing metal oxide nanoparticles from a metal precursor in an organic solvent or aqueous solution has been suggested, but this method uses a toxic organic solvent and generates a large amount of waste water after the processing, and thus causes problems in terms of cost, time and environmental pollution.

Meanwhile, in the case of metal oxide nanoparticles, due to the instability of the nanoparticles, the nano size cannot be retained further when used in various chemical reactions or electrode materials, thereby easily changing the natural characteristics of the nanoparticles. In order to improve the performance of such metal oxide nanoparticles, various attempts are being made to produce various types of composites, and recently, there is an ongoing research to produce a metal oxide nanoparticle/graphene composite by depositing metal oxide nanoparticles on a graphene sheet uniformly, so as to significantly improve the low electrical conductivity and ion conductivity that most metal oxides have, and to buffer for the changes in the volume of the metal oxide. Research is being conducted to utilize such a metal oxide nanoparticle/graphene composite in various fields such as an anode of lithium secondary batteries, high performance capacitors, gas sensors, catalysts and the like.

Methods for preparing such a metal oxide nanoparticle/graphene composite currently being used include a method of dispersing graphene oxide in a solvent where a metal oxide precursor has been dissolved, forming metal oxide nanoparticles on the graphene oxide, and then reducing the graphene oxide thermally or by hydrazine; and a method of mixing graphene oxide and metal precursor with a solvent such as DMF (dimethylformamide), NMP (N-methyl-2-pyrrolidone), EG (ethylene glycol), and water, dispersing the mixture, and then putting the mixture in an autoclave to conduct a solvothermal synthesis or hydrothermal synthesis.

However, these methods take a very long reaction time of about 12 to 48 hours, and require an additional calcination process, leading to a problem of high preparation cost. Furthermore, since the process of generating metal oxide nanoparticles and the process of reducing graphene oxide are separately conducted, the whole process becomes a multistep process, which is also a problem for commercial production. Not only that, there is also a problem that the size distribution of the metal oxide growing on the surface of the prepared graphene composite is too broad, and it is difficult to reduce the size to nanometers, thereby deteriorating the overall performance of the composite.

Therefore, it is acutely needed to develop a method for preparing a metal oxide nanoparticle/graphene composite where metal oxide particles are combined on a surface of graphene, the metal oxide particles being dispersed very uniformly in nano sizes by a simplified one step process in a short time using an eco-friendly solvent with a high yield rate.

SUMMARY

The present invention provides a method for preparing a metal oxide nanoparticle/graphene composite where the metal oxide nanoparticles are uniformly dispersed on a graphene sheet without using a harmful reducing agent or toxic organic solvent.

The present invention also provides a method for preparing a metal oxide nanoparticle/graphene composite by adding graphene oxide and metal oxide nanoparticles inside a reactor so as to cause a one-pot reaction.

Furthermore, the present invention provides a method for preparing a metal oxide nanoparticle/graphene composite in a simplified process and in reduced preparation time.

Furthermore, the present invention provides an anode material with excellent electrical conductivity and charge/discharge characteristics using a metal oxide nanoparticle/graphene composite where the metal oxide nanoparticles are uniformly dispersed on a graphene sheet.

According to an embodiment of the present invention, there is provided a method for preparing a metal oxide nanoparticle/graphene composite, the method including preparing a dispersed solution by dispersing graphene oxide and metal oxide precursor in an organic solvent; and forming the metal oxide nanoparticle/graphene composite by reacting the dispersed solution under a supercritical condition.

The metal oxide precursor may be a metal salt.

The metal salt may include at least one of metal isopropoxide, chloride, acetate, nitrate, acetylacetonate, methoxide, ethoxide, tetraethoxide, butoxide, and sulfide. The metal may include titanium (Ti), aluminum (Al), silicon (Si), tin (Sn), iron (Fe), copper (Cu), manganese (Mn), cobalt (Co), zinc (Zn), vanadium (V), molybdenum (Mo), platinum (Pt), gold (Au), silver (Ag), nickel (Ni), magnesium (Mg), chrome (Cr), tungsten (W), indium (In), lead (Pb), or a combination thereof.

The organic solvent may be an alcohol solvent.

The alcohol solvent may include methanol, ethanol, propanol, isopropylalcohol, butanol, isobutanol, 2-butanol, tert-butanol, n-pentanol, isopentylalcohol, 2-methyl-1-butanol, neopentyl alcohol, diethylmethanol, methylpropylmethanol, methylisopropylmethanol, dimethylethylmethanol, 1-hexanol, 2-hexanol, 3-hexanol, 2-methyl-1-pentanol, 3-methyl-1-pentanol, 4-methyl-1-pentanol, 2-methyl-2-pentanol, 3-methyl-2-pentanol, 4-methyl-2-pentanol, 2-methyl-3-pentanol, 3-methyl-3-pentanol, 2,2-dimethyl-1-butanol, 2,3-dimethyl-1-butanol, 2,3-dimethyl-2-butanol, 3,3-dimethyl-1-butanol, 2-ethyl-1-butanol, 1-heptanol, 2-heptanol, 3-heptanol, 4-heptanol, or a combination thereof.

The amount of graphene oxide included may be about 0.1 to about 1,000 g per 1 L of the dispersed solution.

A weight ratio of the graphene oxide to the metal oxide precursor may be about 1:0.01 to about 1:5.

At the forming the metal oxide nanoparticle/graphene, the dispersed solution may be reacted under a supercritical condition of a temperature of about 100 to about 600° C. and a pressure of about 20 to about 600 bar.

The metal oxide nanoparticle/graphene composite may be formed by a reaction of about 10 seconds to about 6 hours.

The metal oxide nanoparticle/graphene composite may be prepared by a one-pot reaction.

Metal oxide nanoparticles of the metal oxide nanoparticle/graphene composite may have an average particle size of about 1 to about 50 nm.

The metal oxide nanoparticle/graphene composite according to an embodiment of the present invention may be prepared by the aforementioned method.

An anode material according to an embodiment of the present invention may include the metal oxide nanoparticle/graphene composite.

The anode material may have a reversible capacity of 830 mA/g or more after 40 cycles when subjected to a charge/discharge test of 50 mA/g at an operating voltage range of about 0.01 to about 3.0 V.

By using an alcohol solvent under a supercritical condition, in the metal oxide nanoparticle/graphene composite according to the present invention, the metal oxide nanoparticles may be uniformly dispersed on a graphene sheet. Especially, since a heterogeneous nucleation and growth mechanism on the surface of graphene is conducted far more quickly than a homogeneous nucleation and growth mechanism in a supercritical fluid phase, metal oxide particles can be formed in nano size on the graphene surface whereas metal oxide particles in the supercritical fluid are formed to have bigger sizes.

Furthermore, by using a fluid under a supercritical condition, the oxygen existing in the graphene oxide may be removed while the metal oxide nanoparticles are combined on the surface of the graphene, thereby metal oxide formation and deoxygenation may occur at the same time, simplifying the overall process.

Not only that, by using the one-pot reaction, it is possible to prepare a metal oxide nanoparticle/graphene composite at high yield in a short time.

Furthermore, since a metal oxide nanoparticle/graphene composite may be prepared without using a harmful reducing agent or a toxic organic solvent, the method is environmentally friendly.

Furthermore, by adjusting the amount of the metal oxide precursor, it is possible to control easily the metal oxide nanoparticles being combined to the graphene particles.

In a metal oxide nanoparticle/graphene composite prepared according to the present invention, the metal oxide nanoparticles are uniformly dispersed on the graphene, and thus the composite may be used as an anode material in lithium secondary batteries, and may also exhibit excellent electrical conductivity and charge/discharge efficiency when used as an anode in lithium secondary batteries.

Effects of the present invention are not limited to the aforementioned effects, and thus, further effects not mentioned herein may also be clearly understood by those skilled in the art based on the claims attached.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Furthermore, unless defined otherwise, all the terms used in this specification including technical and scientific terms have the same meanings as would be generally understood by those skilled in the related art. The terms defined in generally used dictionaries should be construed as having the same meanings as would be construed in the context of the related art, and unless clearly defined otherwise in this specification, should not be construed as having idealistic or overly formal meanings.

Hereinafter, explanation will be made on a method for preparing a metal oxide nanoparticle/graphene composite using a supercritical fluid, and the metal oxide nanoparticle/graphene composite prepared thereby.

Figure 1:
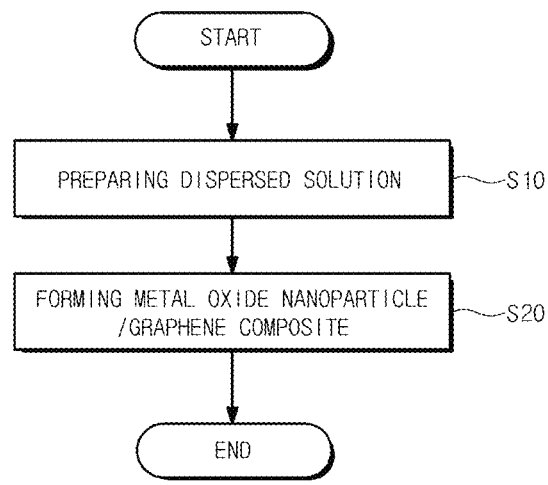
FIG. 1 shows a flowchart of a method for preparing a metal oxide nanoparticle/graphene composite according to an embodiment of the present invention.

Referring to FIG. 1, a method for preparing a metal oxide nanoparticle/graphene composite according to an embodiment of the present invention comprises preparing a dispersed solution (S10) and forming a metal oxide nanoparticle/graphene composite (S20).

At the step of preparing a dispersed solution (S10), graphene oxide and a metal oxide precursor are dispersed in an organic solvent to prepare the dispersed solution. This is a process of preparing a solution for forming the metal oxide nanoparticle/graphene composite.

The graphene oxide may be prepared by processing graphite particles with a strong acid such as sulfuric acid or nitric acid and with an oxidizing agent such as $KMnO_4$ (potassium permanganate). The graphene oxide has a structure of a thin slice of a single atom layer, and may have a functional group such as epoxide

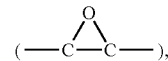

carboxyl(—COOH), carbonyl(—C═O), hydroxyl(—OH) groups that are generated when oxidized.

Since graphene oxide has various functional groups and its density is low, the graphene oxide may be effectively dispersed in various organic solvents.

The amount of graphene oxide included in the dispersed solution may be about 0.1 to about 1,000 g, and preferably about 1 to about 500 g, per 1 L of the dispersed solution. If the amount of the graphene oxide is less than 0.1 g per 1 L of the dispersed solution, the concentration of the graphene oxide will be too low and the amount of graphene sheet or graphene particles being prepared per unit of time is small, thereby decreasing the economic feasibility. If the amount of the graphene oxide exceeds 1,000 g per 1 L of the dispersed solution, the concentration of the graphene oxide will be too high, thereby preventing an effective deoxygenization of the graphene oxide, and decreasing uniformity, and thus deteriorating the quality.

The metal oxide precursor may be metal salt. Any kinds of metal salts may be used as long as it may be dissolved in an organic solvent under room temperature and normal pressure and where metal oxide nanoparticles may be formed in a dispersed solution under a supercritical state.

Preferably, the metal salt may include at least one of metal isopropoxide, chloride, acetate, nitrate, acetylacetonate, methoxide, ethoxide, tetraethoxide, butoxide, and sulfide. The metal may include titanium (Ti), aluminum (Al), silicon (Si), tin (Sn), iron (Fe), copper (Cu), manganese (Mn), cobalt (Co), zinc (Zn), vanadium (V), molybdenum (Mo), platinum (Pt), gold (Au), silver (Ag), nickel (Ni), magnesium (Mg), chrome (Cr), tungsten (W), indium (In), lead (Pb), or a combination thereof.

In some cases, a single kind of metal salt or two or more kinds of metal salt may be mixed and used.

Examples of the metal salt that may be used includes titanium isopropoxide ($Ti[OCH(CH_3)_2]_4$), aluminum isopropoxide ($Al[OCH(CH_3)_2]_3$), tetraethylorthosilicate ($Si(OC_2H_5)_4$), tin chloride ($SnCl_4$), tin acetate ($Sn(CH_3CO_2)_2$), tin sulfate ($SnSO_4$), iron acetate ($Fe(CO_2COH_3)_2$), iron chloride ($FeCl_3$), iron nitrate ($Fe(NO_3)_3$), iron acetylacetonate ($Fe(C_5H_7O_2)_3$), copper acetylacetonate ($Cu(C_5H_7O_2)_2$), manganese acetylacetonate ($Mn(C_5H_7O_2)_3$), cobalt acetylacetonate ($Co(C_5H_7O_2)_3$), zinc acetylacetonate ($Zn(C_5H_7O_2)_2$), vanadium acetylacetonate ($V(C_5H_7O_2)_3$), molybdenyl acetylacetonate ($[CH_3COCH═C(O—)CH_3]_2 MoO_2$), or zinc nitrate ($Zn(NO_3)_2$), but without limitation.

By adjusting the amount of metal oxide precursor to be added, it is possible to adjust the amount of metal oxide nanoparticles to be deposited on the graphene sheet or graphene particles. Preferably, the weight ratio of the graphene oxide to the metal oxide precursor may be about 1:0.01 to about 1:5.

The organic solvent may be an alcohol solvent. The alcohol solvent may effectively disperse the graphene oxide, and since it has a very excellent solvent power for dissolving the metal precursor, a uniform dispersed solution may be prepared.

Preferably, the alcohol solvent may be an alcohol solvent that includes a main chain of about 1 to about 10 carbon numbers and about 1 or more hydroxyl groups, more preferably, that includes a main chain of about 1 to about 7 carbon numbers and about 1 or more hydroxyl groups.

Specifically, the alcohol solvent may include methanol, ethanol, propanol, isopropylalcohol, butanol, isobutanol, 2-butanol, tert-butanol, n-pentanol, isopentylalcohol, 2-methyl-1-butanol, neopentyl alcohol, diethylmethanol, methylpropylmethanol, methylisopropylmethanol, dimethylethylmethanol, 1-hexanol, 2-hexanol, 3-hexanol, 2-methyl-1-pentanol, 3-methyl-1-pentanol, 4-methyl-1-pentanol, 2-methyl-2-pentanol, 3-methyl-2-pentanol, 4-methyl-2-pentanol, 2-methyl-3-pentanol, 3-methyl-3-pentanol, 2,2-dimethyl-1-butanol, 2,3-dimethyl-1-butanol, 2,3-dimethyl-2-butanol, 3,3-dimethyl-1-butanol, 2-ethyl-1-butanol, 1-heptanol, 2-heptanol, 3-heptanol, or 4-heptanol, or a combination of two or more thereof.

At the step of preparing a dispersed solution (S10), the graphene oxide may be dispersed in the organic solvent in a short time using an external force such as sonication or vortex dispersion.

The forming a metal oxide nanoparticle/graphene composite (S20) is a step of forming the metal oxide nanoparticle/graphene composite by reacting the dispersed solution prepared at the step of preparing a dispersed solution (S10) under a supercritical condition.

The reaction may be performed in a batch type reactor or a continuous process reactor. The continuous process reactor has an advantage that the stability of the metal oxide nanoparticle/graphene composite characteristics may be retained when being mass produced.

The dispersed solution may be reacted under a supercritical condition of a temperature of about 100 to about 600° C. and a pressure of about 20 to about 600 bar, preferably under a supercritical condition of a temperature of about 300 to about 500° C. and a pressure of about 100 to about 500 bar. If the reaction temperature is less than 100° C. or the reaction pressure is less than 20 bar, the reducing capability of the organic solvent at a supercritical state will deteriorate, thereby not effectively proceeding the deoxygenization reaction of the graphene oxide, and thus generating graphene having a low electrical conductivity. If the reaction temperature exceeds 600° C. or the reaction pressure exceeds 600 bar, economic feasibility may deteriorate due to the problem of maintaining the high temperature and high pressure.

The reaction time at the step of forming a metal oxide nanoparticle/graphene composite (S20) may be about 10 seconds to about 6 hours, preferably about 1 minute to about 4 hours. If the reaction time is less than 10 seconds, the time that the dispersed solution stays in the reactor will be too short, thereby not effectively proceeding the deoxygenization reaction of the graphene oxide in the supercritical organic solvent, and thus generating a low quality graphene with a low electrical conductivity, and if the reaction time exceeds 6 hours, the time that the dispersed solution stays under a high temperature and high pressure condition will be too long, thereby deteriorating productivity and economic feasibility.

The alcohol solvent may include methanol (critical temperature=239° C.; critical pressure=81 bar), ethanol (critical temperature=241° C.; critical pressure=63 bar), propanol (critical temperature=264° C.; critical pressure=52 bar), isopropylalcohol (critical temperature=307° C.; critical pressure=41 bar), butanol (critical temperature=289° C.; critical pressure=45 bar), isobutanol (critical temperature=275° C.; critical pressure=45 bar), 2-butanol (critical temperature=263° C.; critical pressure=42 bar), tert-butanol (critical temperature=233° C.; critical pressure=40 bar), n-pentanol (critical temperature=307° C.; critical pressure=39 bar), isopentyl alcohol (critical temperature=306° C.; critical pressure=39 bar), 2-methyl-1-butanol (critical temperature=302° C.; critical pressure=39 bar), neopentyl alcohol (critical temperature=276° C.; critical pressure=40 bar), diethyl carbinol (critical temperature=286° C.; critical pressure=39 bar), methyl propyl carbinol (critical temperature=287° C.; critical pressure=37 bar), methyl isopropyl carbinol (critical temperature=283° C.; critical pressure=39 bar), dimethyl ethyl carbinol (critical temperature=271° C.; critical pressure=37 bar), 1-hexanol (critical temperature=337° C.; critical pressure=34 bar), 2-hexanol (critical temperature=310° C.; critical pressure=33 bar), 3-hexanol (critical temperature=309° C.; critical pressure=34 bar), 2-methyl-1-pentanol (critical temperature=331° C.; critical pressure=35 bar), 3-methyl-1-pentanol (critical temperature=387° C.; critical pressure=30 bar), 4-methyl-1-pentanol (critical temperature=330° C.; critical pressure=30 bar), 2-methyl-2-pentanol (critical temperature=286° C.; critical pressure=36 bar), 3-methyl-2-pentanol (critical temperature=333° C.; critical pressure=36 bar), 4-methyl-2-pentanol (critical temperature=301° C.; critical pressure=35 bar), 2-methyl-3-pentanol (critical temperature=303° C.; critical pressure=35 bar), 3-methyl-3-pentanol (critical temperature=302° C.; critical pressure=35 bar), 2,2-dimethyl-1-butanol (critical temperature=301° C.; critical pressure=35 bar), 2,3-dimethyl-1-butanol (critical temperature=331° C.; critical pressure=35 bar), 2,3-dimethyl-2-butanol (critical temperature=331° C., critical pressure=35 bar), 3,3-dimethyl-1-butanol (critical temperature=331° C.; critical pressure=35 bar), 2-ethyl-1-butanol (critical temperature=307° C.; critical pressure=34 bar), 1-heptanol (critical temperature=360° C.; critical pressure=31 bar), 2-heptanol (critical temperature=335° C.; critical pressure=30 bar), 3-heptanol (critical temperature=332° C.; critical pressure=30 bar), and 4-heptanol (critical temperature=329° C.; critical pressure=30 bar), or a combination thereof. Hereinabove, the supercritical conditions are above critical temperature and critical pressure of each alcohol.

By reacting under a supercritical condition at the step of forming a metal oxide nanoparticle/graphene composite (S20), titanium oxide, aluminum oxide, silicon oxide, tin oxide, iron oxide, copper oxide, manganese oxide, cobalt oxide, zinc oxide, vanadium oxide, molybdenum oxide, platinum oxide, gold oxide, silver oxide, nickel oxide, magnesium oxide, chrome oxide, tungsten oxide, indium oxide, or lead oxide may be formed on the graphene sheet or graphene particles.

Metal oxide nanoparticles of the metal oxide nanoparticle/graphene composite may have an average particle size of about 50 nm or less, preferably about 1 to about 50 nm, and more preferably about 1 to about 30 nm. According to the preparation method of the present invention, the metal oxide particles of nano sizes uniformly formed on the graphene.

A metal oxide nanoparticle/graphene composite according to an embodiment of the present invention may be prepared by the aforementioned method, and in a simple one-pot reaction by adding a metal oxide precursor, graphene oxide and organic solvent in one reactor and applying a supercritical condition, thereby obtaining a metal oxide nanoparticle/graphene composite in a short time with a high yield compared to a conventional method.

The aforementioned metal oxide nanoparticle/graphene composite has excellent electrical characteristics, and may be applied usefully as an anode material, and may preferably be used as an anode material for lithium secondary batteries.

In a case of using the metal oxide nanoparticle/graphene composite as an anode material, the charge/discharge characteristics and cycle characteristics are excellent. Specifically, the anode material may have an reversible capacity of about 830 mAh/g or more after about 40 cycles when subjected to a charge/discharge test of 50 mA/g at an operating voltage range of about 0.01 to about 3.0 V, preferably about 850 mAh/g or more, and more preferably about 870mAh/g or more.

EXAMPLES

Hereinafter, explanation will be made on a test result conducted to prove excellent effects of a method for preparing a metal oxide nanoparticle/graphene composite of the present invention. The present invention will be explained in detail based on the embodiments, but without limitation.

The metal oxide nanoparticle/graphene composite prepared according to the examples and comparative examples that will be shown below were analyzed for morphology, amount of metal oxide nanoparticles formed on the graphene oxide, crystalline characteristics of the metal oxide nanoparticles and graphene, and extent of deoxygenization reaction of the graphene oxide.

Analyzing methods used for each item are as follows.

In order to analyze morphology of the metal oxide nanoparticle/graphene composite, a TEM (Transmission Electron Microscopy) of EFI, and a SEM (Scanning Electron Microscope) of Hitachi were used.

In order to analyze an amount of the metal oxide nanoparticles formed on the graphene oxide, a TGA (Thermal Gravimetric Analyzer) of TA Instruments was used.

In order to observe the crystalline characteristics of the metal oxide nanoparticles and graphene, an XRD (X-ray Diffraction Analyzer) of Rigaku was used.

In order to analyze an extent of deoxygenization reaction of the graphene oxide, an XPS (X-ray Photoelectron Spectroscopy) of Physical Electronic was used.

Example 1

The graphene oxide was prepared by processing graphite powder with strong acid, $K_2S_2O_8$ and $P_2O_5$ and with $KMnO_4$ and $H_2O_2$ according to a modified Hummers method. As a metal precursor, titanium isopropoxide (Ti$[OCH(CH_3)_2]_4$, hereinafter referred to as 'TTIP') was used. As a solvent, 2-propanol ($[CH_3]_2CHOH$, hereinafter referred to as 'IPA') was used. 1.0 g of TTIP and then 0.5 g of graphene oxide were put into a 4 ml IPA, and then the graphene oxide was dispersed in the IPA for 1 hour using an ultrasonic stirrer. The compound made by the aforementioned process was put into a reactor made of SUS 316 of a volume of 1l, and then the reactor was tightly sealed. Then, the reactor was put into a salt bath whose temperature was maintained at 400° C., and then reacted for 1 hour. After 1 hour reaction, the reactor was taken out of the salt bath and then put into a cooling water to be cooled quickly. Then a titanium dioxide nanoparticle/graphene composite was collected from the reactor.

Figure 2:
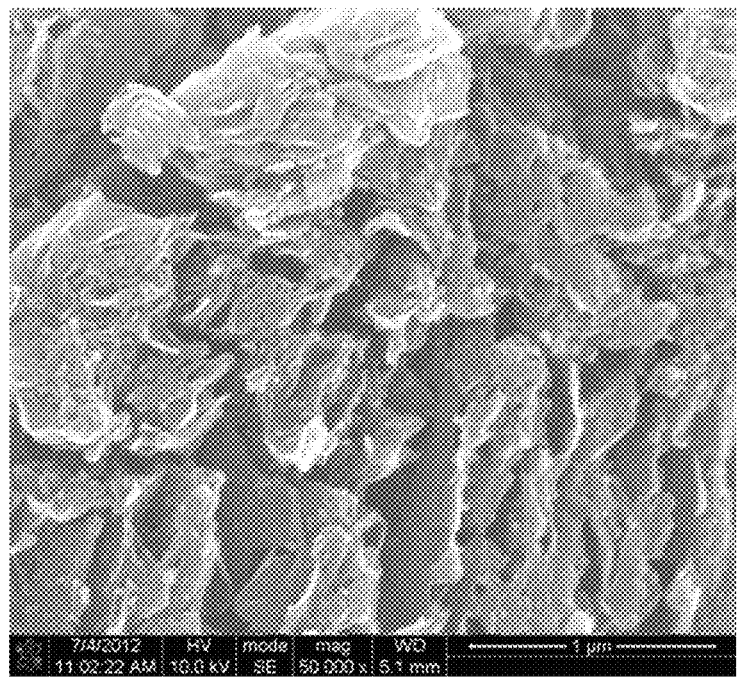
FIG. 2 shows a SEM (scanning electron microscopy) image of a metal oxide nanoparticle/graphene composite prepared by Example 1 of the present invention.
Figure 3:
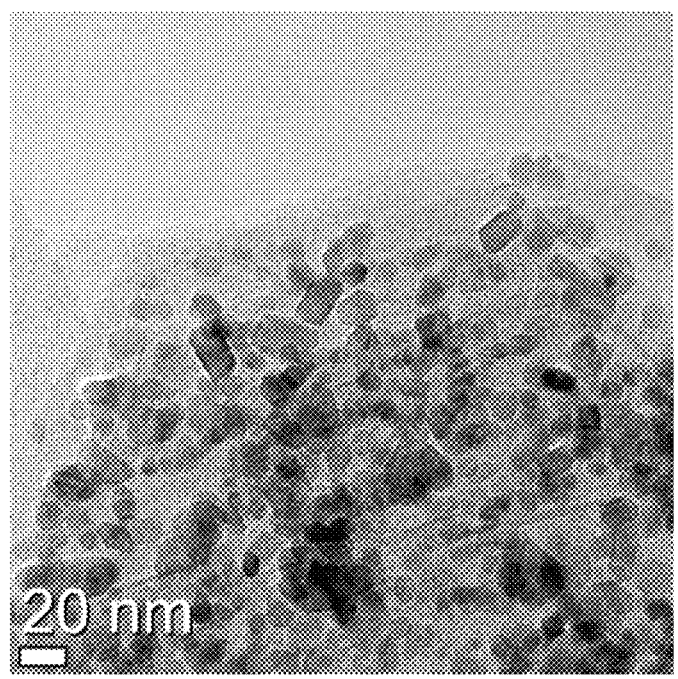
FIG. 3 shows a TEM (transmission electron microscopy) image of a metal oxide nanoparticle/graphene composite prepared by Example 1 of the present invention.
Figure 4:
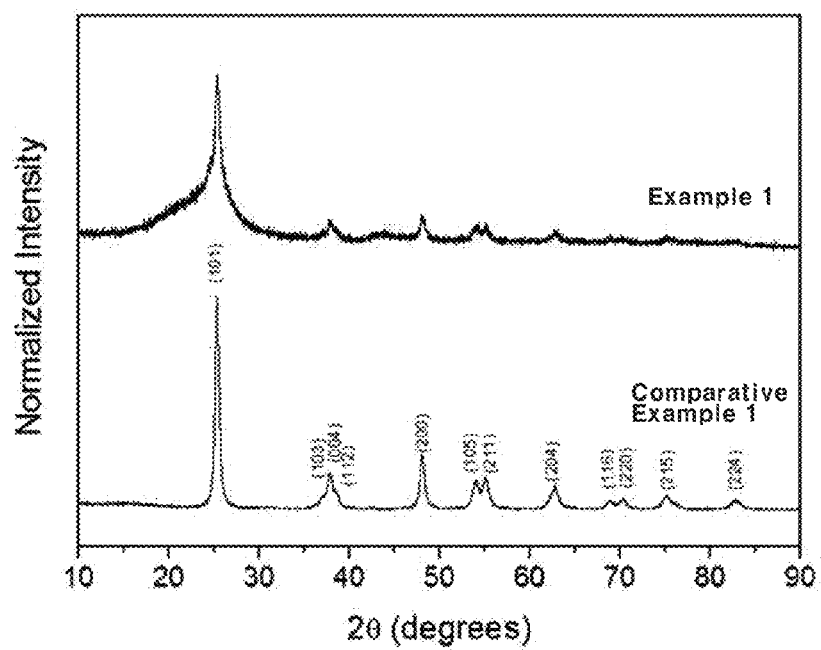
FIG. 4 shows a XRD (X-ray diffraction) graph of a metal oxide nanoparticle/graphene composite prepared by Example 1 and titanium dioxide nanoparticles prepared by Comparative Example 1.

As a result of analyzing the collected titanium dioxide nanoparticle/graphene composite by SEM, it was observed that titanium dioxide nanoparticles of a uniform nano size were deposited on the graphene sheet as can be seen from the SEM image of FIG. 2, and that no titanium dioxide particles of a micron size were formed. Furthermore, as illustrated in FIG. 3, it was observed from the HR-TEM image, that titanium dioxide nanoparticles of a 10-20 nm size were uniformly deposited on the graphene oxide surface. From the XRD pattern of FIG. 4, it was observed that titanium dioxide nanoparticles of anatase phase were deposited on the graphene sheet.

Example 2

A titanium dioxide nanoparticle/graphene composite was prepared in the same manner as in Example 1, except that 2.5 g of TTIP was used instead of 1.0 g.

Example 3

A titanium dioxide nanoparticle/graphene composite was prepared in the same manner as in Example 1, except that 5.0 g of TTIP was used instead of 1.0 g.

Example 4

A titanium dioxide nanoparticle/graphene composite was prepared in the same manner as in Example 1, except that 0.1 g of TTIP was used instead of 1.0 g.

Figure 5:
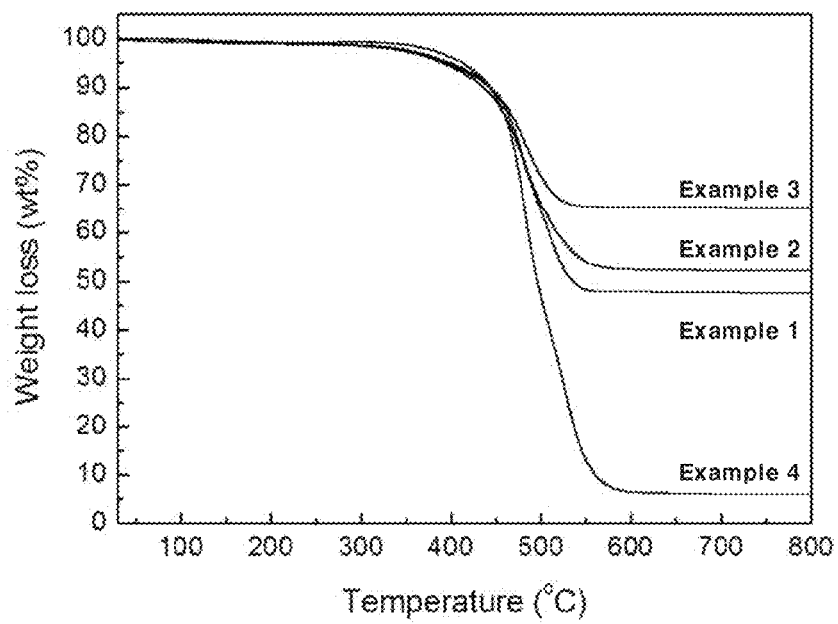
FIG. 5 shows a TGA (thermal gravimetric analysis) graph of metal oxide nanoparticle/graphene composites prepared by Examples 1 to 4.

FIG. 5 shows analyses by a TGA conducted on the titanium dioxide nanoparticle/graphene composites prepared according to Examples 1 to 4 under an oxygen atmosphere. It was observed that the amount of titanium dioxide left after burning the graphene sheet at a high temperature was about 6 to about 65 wt %, meaning that the amount of titanium dioxide in the titanium dioxide nanoparticle/graphene composite may be adjusted in a very broad range.

Comparative Example 1

Figure 6:
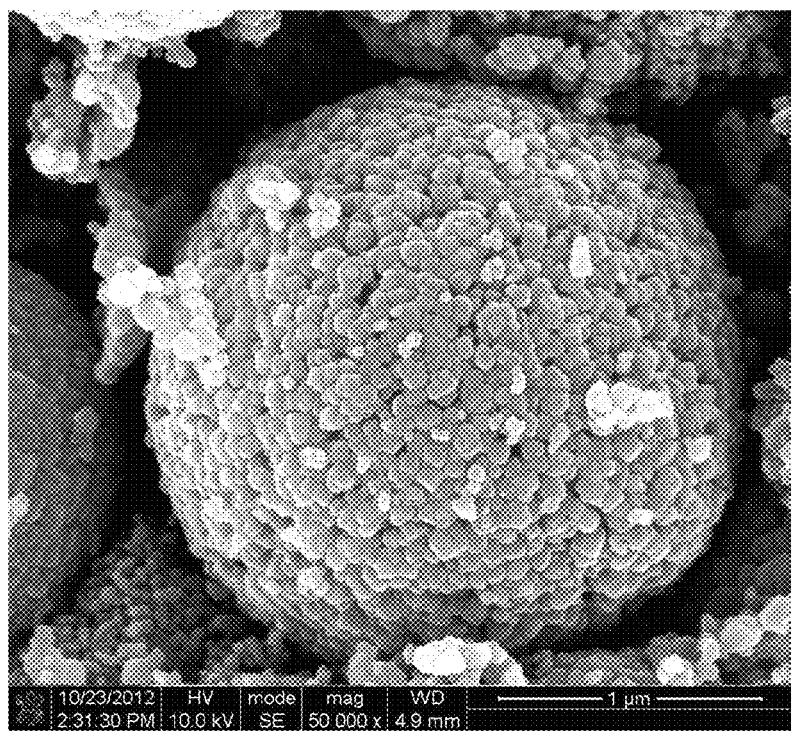
FIG. 6 shows a SEM image of titanium dioxide nanoparticles prepared by Comparative Example 1.

Titanium dioxide nanoparticles were prepared in the same manner as in Example 1, except that only TTIP was used under a supercritical IPA condition without using graphene oxide, and the result was as shown in FIG. 6.

From the SEM image of FIG. 6, it can be observed that titanium dioxide nanoparticles having a primary particle size of about 50-100 nm were aggregated together to form secondary particles of about 1 μm. Thus, it can be seen that the size of the titanium dioxide nanoparticles formed on the graphene surface is smaller.

Comparative Example 2

A reduced graphene was prepared in the same manner as Example 1, except that a functional group including oxygen existing in the graphene oxide was removed by a deoxygenization reaction under a supercritical IPA condition without using TTIP but using only the graphene oxide.

Figure 7:
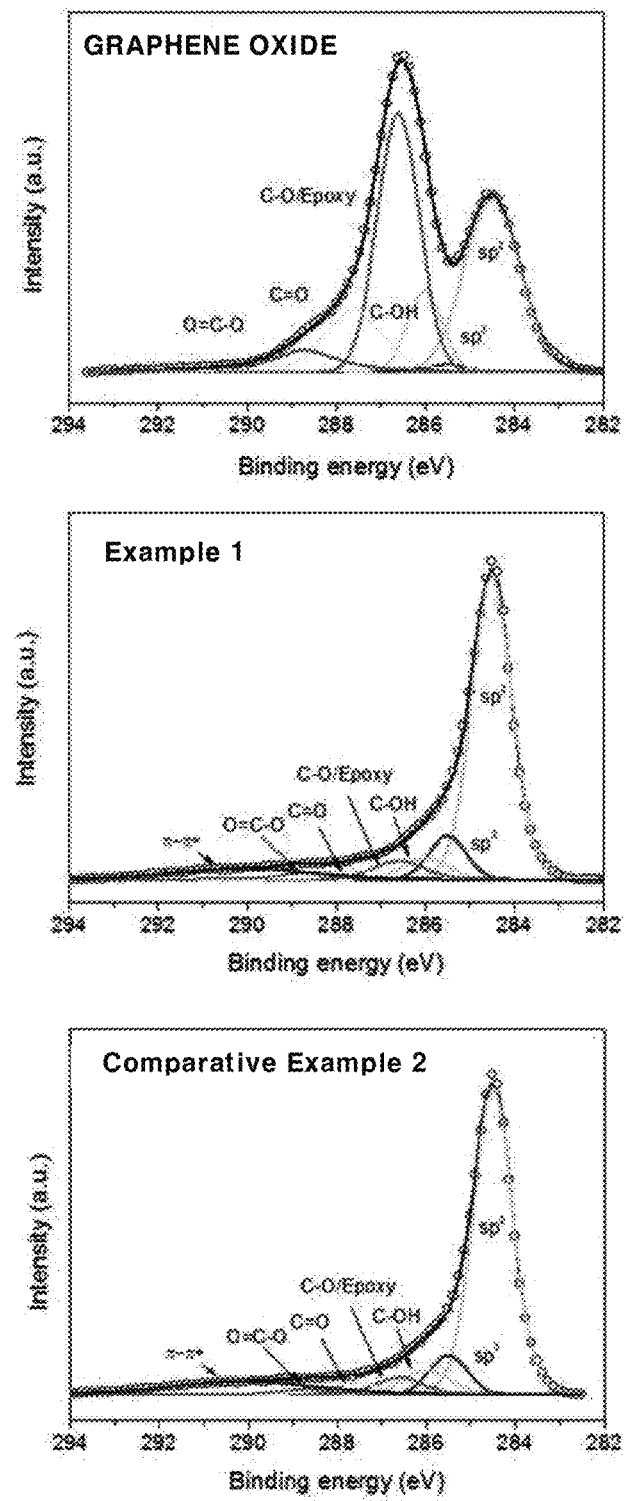
FIG. 7 shows XPS (X-ray photoelectron spectroscopy) graphs of graphene oxide, a metal oxide nanoparticle/graphene composite prepared by Example 1, and a reduced graphene prepared by Comparative Example 2.

As shown in FIG. 7, the C1s high-resolution XPS result of the titanium dioxide nanoparticle/graphene composite prepared by Example 1 and the C1s high-resolution XPS result of the reduced graphene prepared by the deoxygenization reaction under the supercritical IPA of Comparative Example 2 were similar to each other, indicating that the functional group including oxygen existing in the graphene oxide has been removed.

Example 5

As the metal precursor, iron nitrate nonahydrate (Fe$_2$(NO$_3$)$_3$.9H$_2$O, hereinafter referred to as 'iron nitrate') was used. As the solvent, ethanol (C$_2$H$_5$OH) was used. 1.0 g of iron nitrate and 0.5 g of graphene oxide were put into 4 ml of ethanol, and then the graphene oxide was dispersed in the ethanol for 1 hour using an ultrasonic stirrer. The compound prepared as aforementioned was put into a reactor made of an SUS 316 of a volume of 11 ml, and then the reactor was tightly sealed. After that, the reactor was put into a salt bath whose temperature was maintained at 400° C. and reacted for 1 hour. About 1 hour later, the reactor was taken out of the salt bath and then put into a cooling water to be cooled quickly. Then an iron oxide nanoparticle/graphene composite was collected from the reactor.

Figure 8:
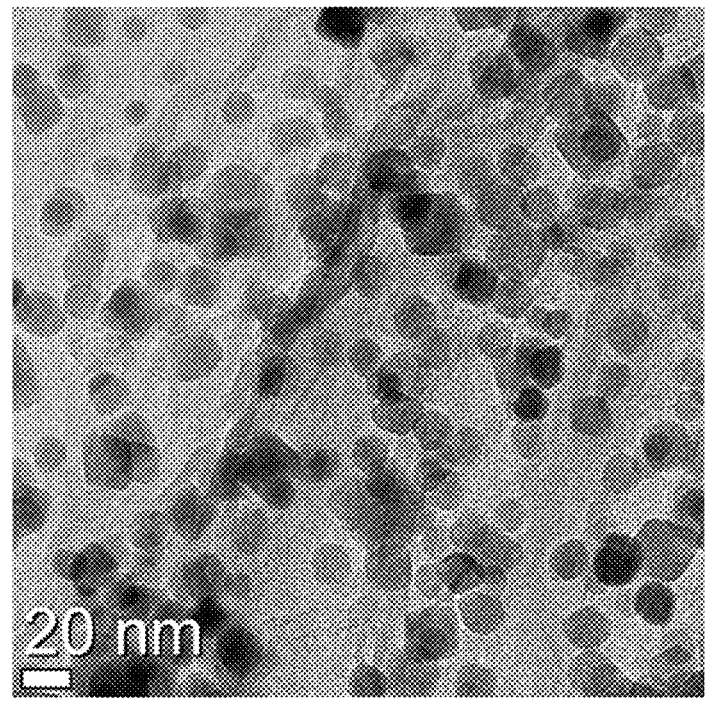
FIG. 8 shows a TEM image of a metal oxide nanoparticle/graphene composite prepared by Example 5.
Figure 9:
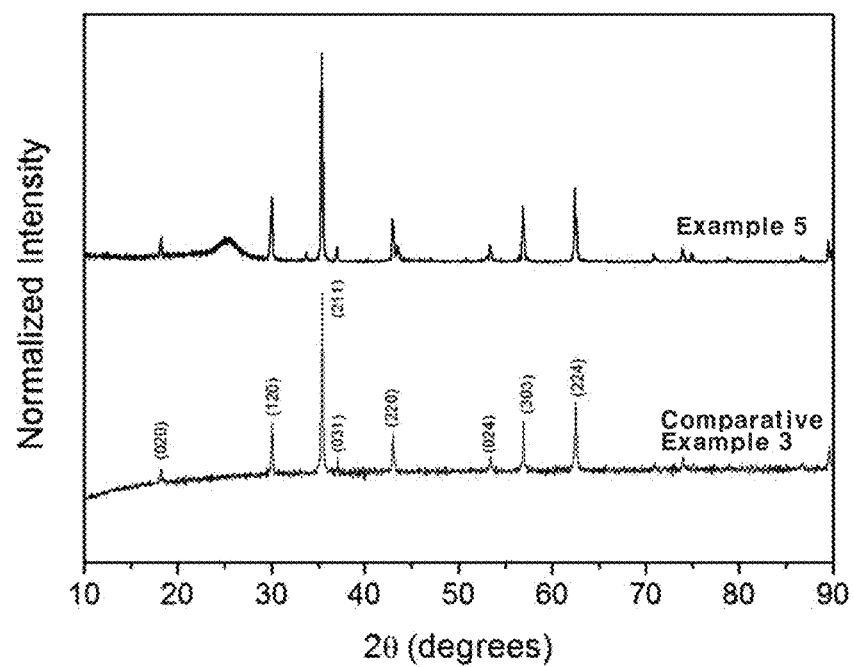
FIG. 9 shows a XRD graph of a metal oxide nanoparticle/graphene composite prepared by Example 5 and iron oxide nanoparticles prepared by Comparative Example 3.
Figure 10:
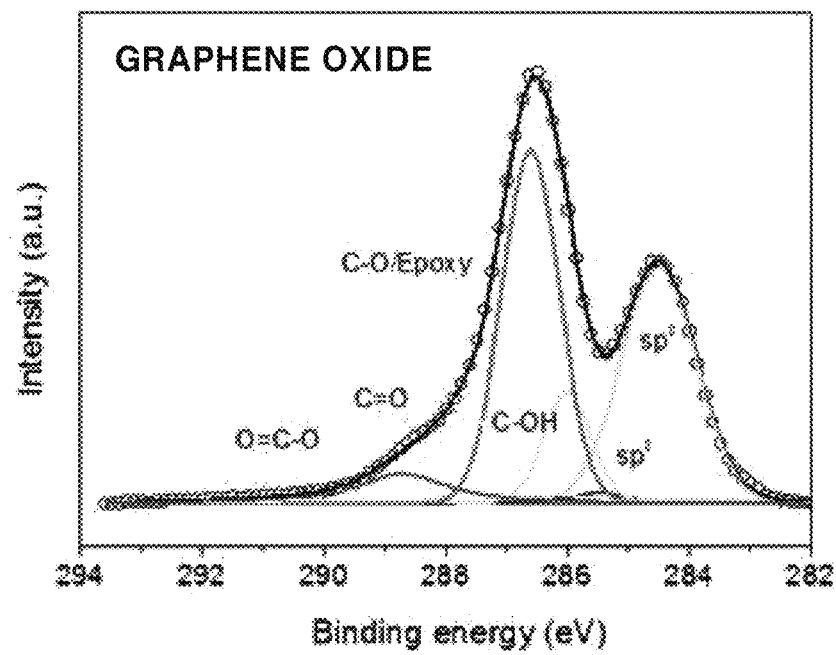
FIG. 10 shows XPS graphs of graphene oxide and a metal oxide nanoparticle/graphene composite prepared by Example 1.
Figure 10:
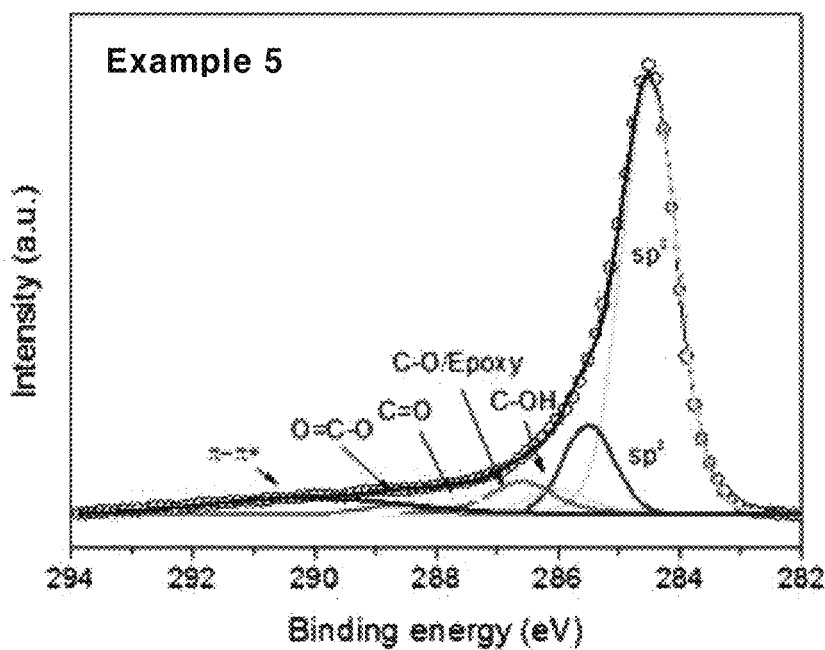

As illustrated in FIG. 8, the result of an HR-TEM analysis conducted on the iron oxide nanoparticle/graphene composite prepared by Example 5 shows that iron oxide nanoparticles having a particle size of 5-30 nm were deposited on the graphene sheet. As illustrated in FIG. 9, from an XRD analysis result, it was observed that iron oxide has a Fe$_3$O$_4$ (magnetite) crystalline structure forming a composite with the graphene. From FIG. 10 showing the C1s high-resolution XPS result of the iron oxide/graphene composite prepared according to Example 5, it was observed that most of the functional groups including oxygen of the graphene oxide were removed, and the functional group including oxygen existing in the graphene oxide has been removed while the iron oxide was being formed.

Example 6

An iron oxide nanoparticle/graphene composite was prepared in the same manner as in Example 5, except that 0.1 g of iron nitrate was used instead of 1.0 g.

Example 7

An iron oxide nanoparticle/graphene composite was prepared in the same manner as in Example 5, except that 0.25 g of iron nitrate was used instead of 1.0 g.

Example 8

An iron oxide nanoparticle/graphene composite was prepared in the same manner as in Example 5, except that 0.5 g of iron nitrate was used instead of 1.0 g.

Figure 11:
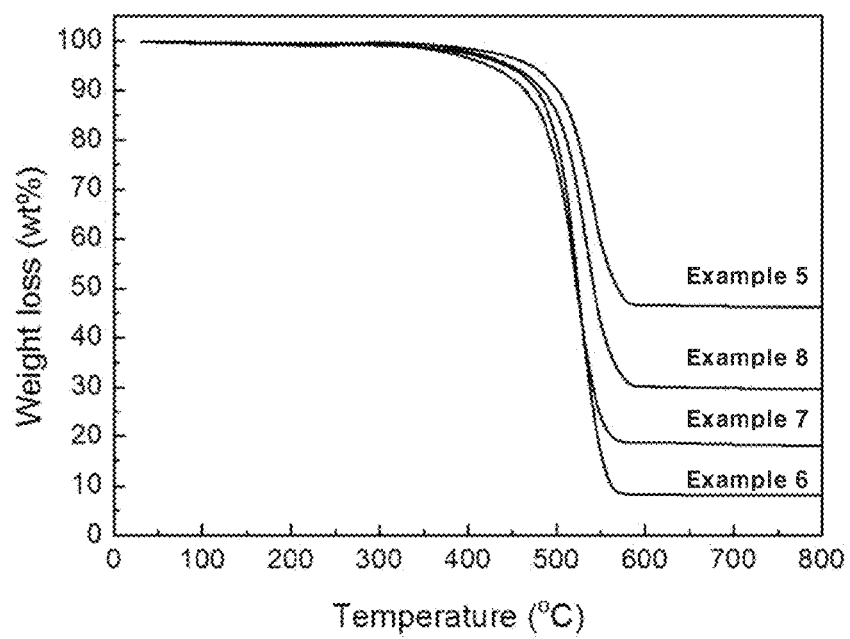
FIG. 11 shows a TGA graph of metal oxide nanoparticle/graphene composites prepared by Examples 5 to 8.

Referring to FIG. 11, it was observed from TGA analysis results of Examples 5 to 8 that the amount of iron oxide remaining after burning the graphene sheet at a high temperature was changed according to the amount of iron nitrate used to prepare an iron oxide nanoparticle/graphene composite. It was observed that in the case of iron oxide nanoparticle/graphene composites prepared by mixing iron nitrate of about 0.1, 0.25, 0.5, and 1.0 g with the graphene oxide sheet respectively according to Examples 5 to 8, the amount of iron oxide in the composites was about 8.25 wt %, 18.39 wt %, 29.95 wt %, and 46.4 wt %, respectively. Accordingly, it was observed that by adjusting the amount of iron nitrate used, it is possible to adjust the amount ratio of the iron oxide in the iron oxide nanoparticle/graphene composite.

Comparative Example 3

Figure 12:
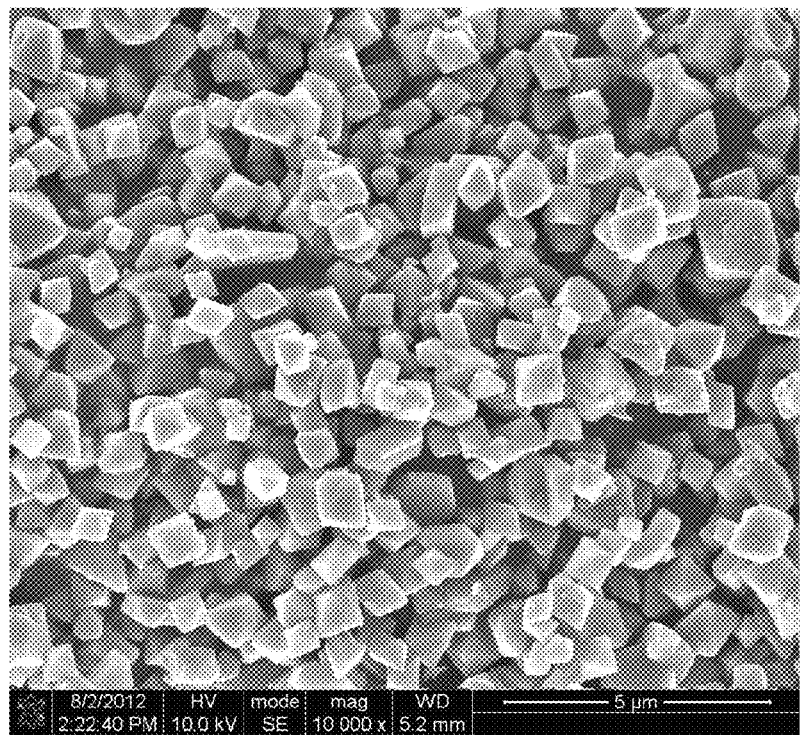
FIG. 12 shows a SEM image of iron oxide nanoparticles prepared by Comparative Example 3.

Fe$_3$O$_4$ nanoparticles were prepared in the same manner as in Example 5, except not using graphene oxide but using only iron nitrate under a supercritical ethanol condition, and the result was as in FIG. 12.

As can be seen from the SEM image of FIG. 12, iron oxide particles having a particle size of about 500-10000 nm were formed, showing that the size of the iron oxide nanoparticles formed on the graphene surface is smaller.

Example 9

As the metal precursor, Sn(CH$_3$CO$_2$)$_2$ (tin acetate) was used. As the solvent, C$_2$H$_5$OH (ethanol) was used. 0.5 g of tin acetate and 0.3 g of graphene oxide were put into about 4 ml of ethanol, and the graphene oxide was dispersed in the ethanol for about 1 hour using an ultrasonic stirrer. The compound made as aforementioned was put into a reactor made of SUS 316 of a volume of about 11 ml, and then the reactor was tightly sealed. After that, the reactor was put into a salt bath of about 400° C. and reacted for about 1 hour. After 1 hour reaction, the reactor was taken out of the salt bath and then put into a cooling water to be cooled quickly. Then a tin oxide nanoparticle/graphene composite was collected from the reactor.

Figure 13:
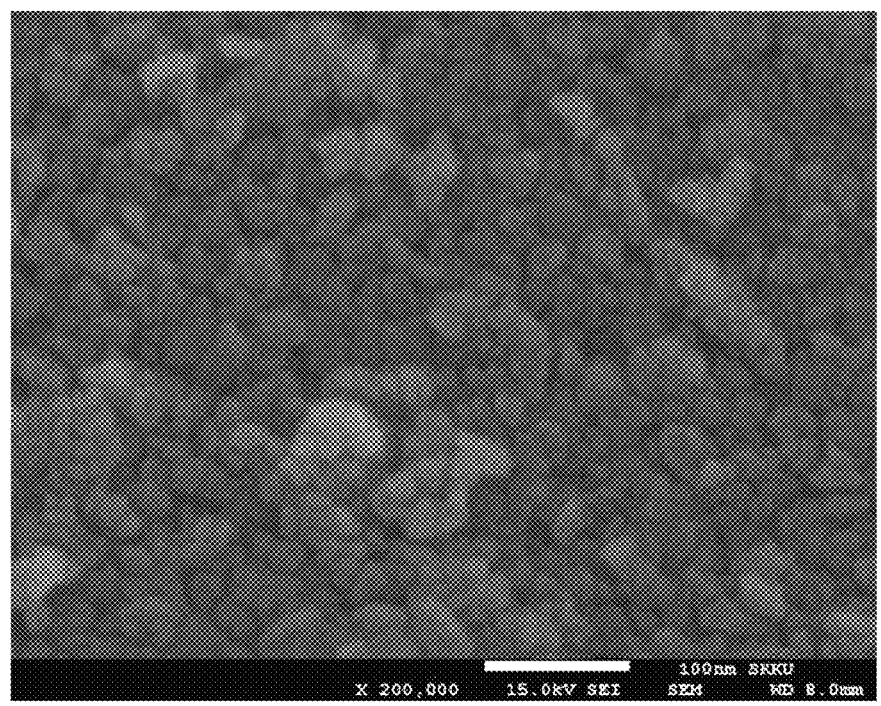
FIG. 13 shows a SEM image of a metal oxide nanoparticle/graphene composite prepared by Example 9.
Figure 14:
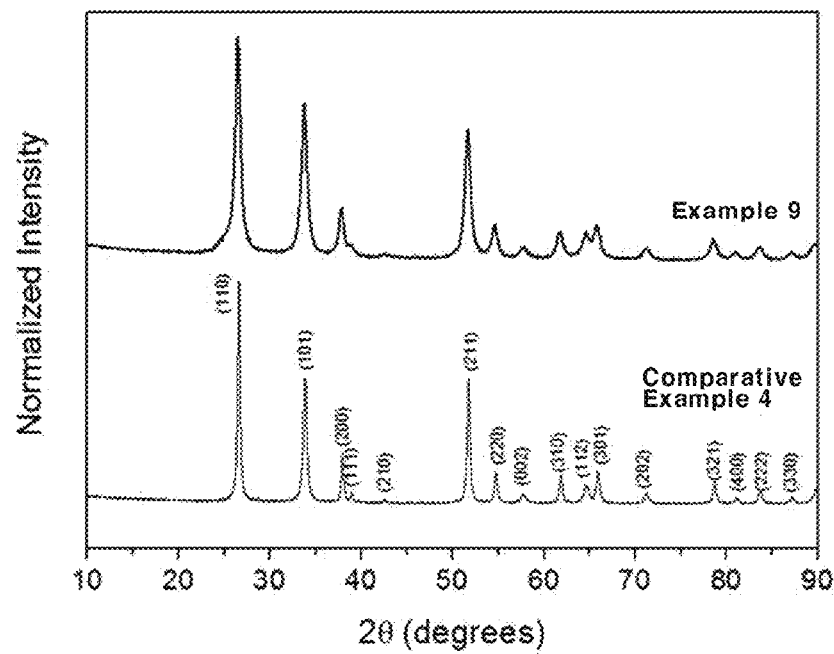
FIG. 14 shows a XRD graph of a metal oxide nanoparticle/graphene composite prepared by Example 9 and tin oxide nanoparticles prepared by Comparative Example 4.
Figure 15:
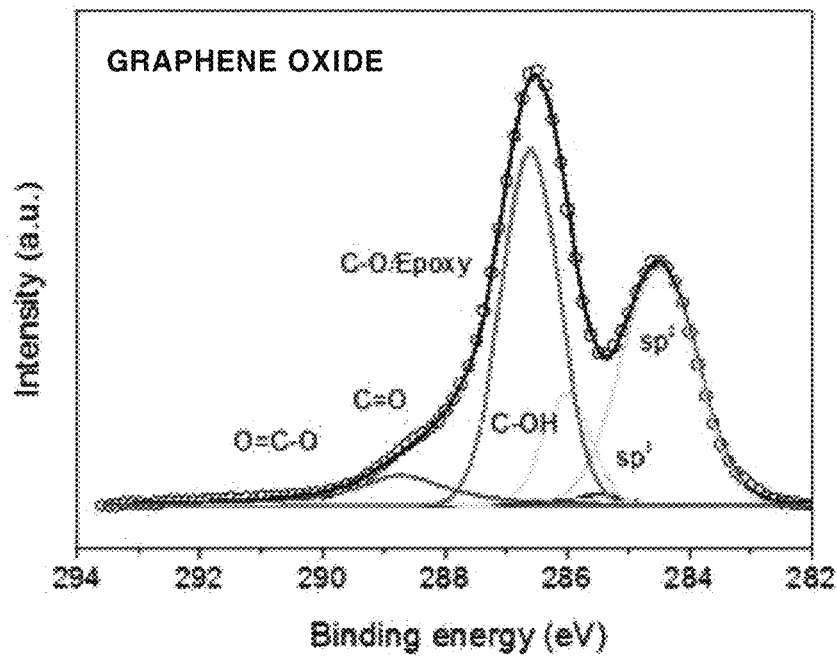
FIG. 15 shows XPS graphs of graphene oxide and a metal oxide nanoparticle/graphene composite prepared by Example 9.
Figure 15:
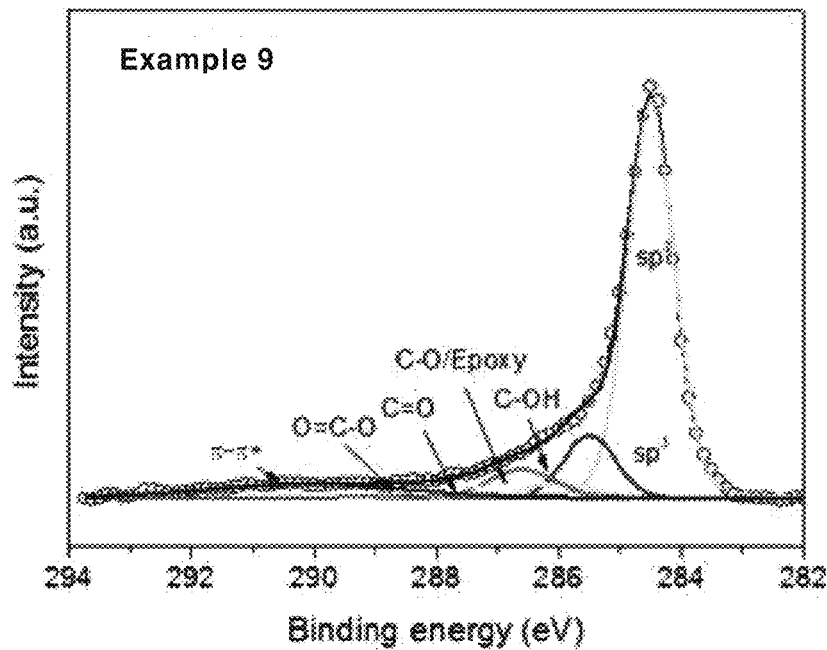

Referring to FIG. 13, from an SEM analysis result of Example 9, it was observed that tin oxide nanoparticles having a particle size of about 5 to about 30 nm were deposited on the graphene sheet. Referring to FIG. 14, it was observed from an XRD analysis result that the tin oxide has a SnO$_2$ (magnetite) crystalline structure forming a composite with graphene. From FIG. 15 showing the C1s high-resolution XPS result of the tin oxide/graphene composite prepared according to Example 9, it was observed that most of the functional groups including oxygen of the graphene oxide were removed, and the functional group including oxygen existing in the graphene oxide has been removed while the tin oxide was being formed.

Example 10

A tin oxide nanoparticle/graphene composite was prepared in the same manner as in Example 9, except that 0.1 g of tin acetate was used instead of 0.5 g.

Example 11

A tin oxide nanoparticle/graphene composite was prepared in the same manner as in Example 9, except that 1.0 g of tin acetate was used instead of 0.5 g.

Figure 16:
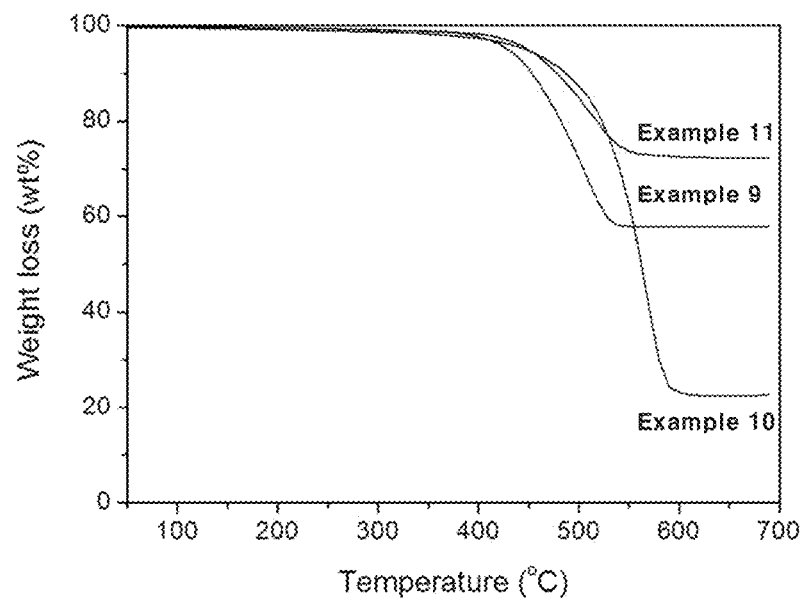
FIG. 16 shows a TGA graph of a metal oxide nanoparticle/graphene composite prepared by Examples 9 to 11.

Referring to FIG. 16, it was observed from TGA analysis results of the tin oxide nanoparticle/graphene composite prepared according to Examples 9 to 11 that the amount of tin oxide remaining after burning and removing the graphene sheet was changed according to the amount of tin acetate used to prepare the tin oxide nanoparticle/graphene composite.

It was observed that in the case of tin oxide nanoparticle/graphene composites prepared by mixing tin acetate of about 0.5, 0.1, and 1.0 g with the graphene oxide sheet respectively according to Examples 9 to 11, the amount of tin oxide in the composites was about 57.8 wt %, 22.5 wt %, and 72.8 wt %, respectively. Accordingly, it was observed that by adjusting the amount of tin acetate used, it is possible to adjust the amount ratio of the tin oxide in the tin oxide nanoparticle/graphene composite.

Comparative Example 4

Figure 17:
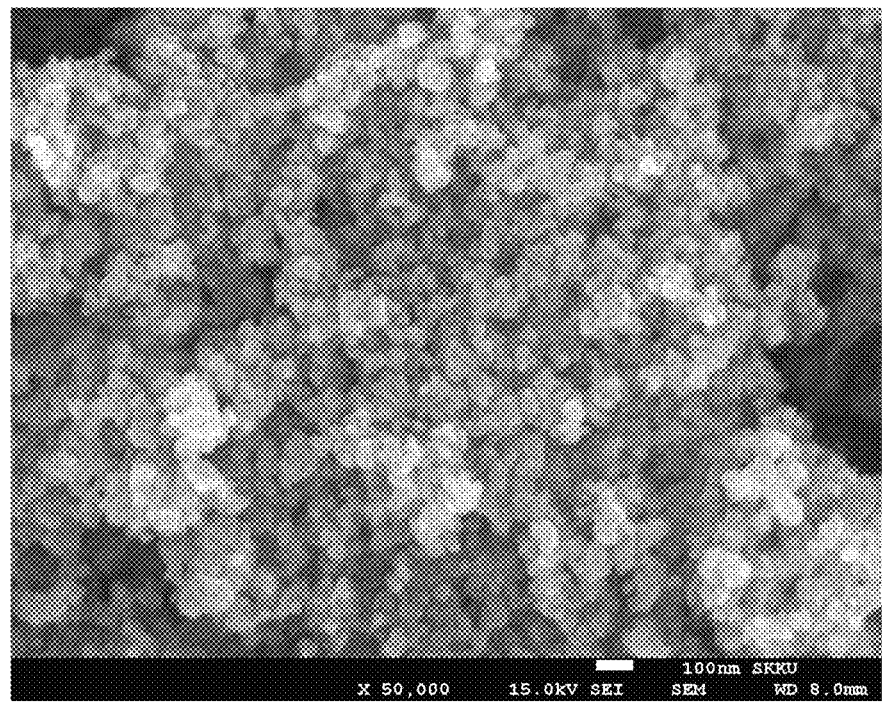
FIG. 17 shows a SEM image of tin oxide nanoparticles prepared by Comparative Example 4.

Tin oxide nanoparticles were prepared in the same manner as in Example 9 except not using graphene oxide but using only tin acetate under a supercritical ethanol condition, and the result was as shown in FIG. 17.

As can be seen from the SEM image of FIG. 17, tin oxide particles having a particle size of 10-50 nm were formed.

Measuring Discharge Capacity of Battery

Example 12

In order to analyze the electrochemical characteristics of a secondary battery active material as one of application fields of the metal oxide nanoparticle/graphene composite, acetylene black was used as a conductive agent, and polyvinylidene fluoride was used as a binder so as to prepare an anode. Herein, a slurry was prepared by mixing the titanium dioxide nanoparticle/graphene composite prepared according to Example 1:conducting agent:binder in a weight ratio of about 70:10:20 in n-methyl pyrrolidone as a solvent. The prepared slurry was deposited on a copper foil as a thin electrode plate of a thickness of about 250 μm, and then dried in an about 80° C. oven for about 6 hours or more. As the electrolyte solution, EC (ethylene carbonate):EMC (ethyl methyl carbonate):DEC (Diethyl carbonate) were mixed in a volume ratio of about 1:1:1 and used. And as a counter electrode, Li metal was used and $LiPF_6$ was dissolved in the electrolyte so as to prepare coin cell type half battery. The charge/discharge property and cyclability of the battery was examined at a voltage of about 0.01 to about 3.0 V and a current density of about 50 mA/g, and the result was shown in FIG. 18.

Example 13

Using the iron oxide nanoparticle/graphene composite of Example 5 instead of Example 1, a battery was prepared according to the same manner as in Example 12, and the charge/discharge property and cyclability of the battery was examined at a voltage of about 0.01 to about 3.0 V and a current density of about 50 mA/g. The result was shown in FIG. 19a. Furthermore, the charge/discharge property and cyclability of the battery at a high rate was examined while changing the current density from about 50 mA/g to about 50,000 mA/g, and the result was shown in FIG. 19b.

Example 14

Using the tin oxide nanoparticle/graphene composite of Example 9 instead of Example 1, a battery was prepared according to the same manner as in Example 12, and the charge/discharge property and cyclability of the battery was examined at a voltage of about 0.01 to about 3.0 V and a current density of about 50 mA/g. The result was shown in FIG. 20a. Furthermore, the charge/discharge property and cyclability of the battery at a high rate was examined while changing the current density from about 50 mA/g to about 5,000 mA/g, and the result was shown in FIG. 20b.

Comparative Example 5

In order to compare and analyze the electrochemical characteristics of the metal oxide nanoparticle/graphene composite and metal oxide, acetylene black was used as a conductive agent, and polyvinylidene fluoride was used as a binder so as to prepare an anode. Herein, a slurry was prepared by mixing the titanium dioxide prepared according to Comparative Example 1:conducting agent:binder in a weight ratio of about 70:10:20 in n-methyl pyrrolidone as a solvent. The prepared slurry was deposited on a copper foil as a thin electrode plate of a thickness of about 250 μm, and then dried in about 80° C. oven for about 6 hours or more. As the electrolyte solution, EC (ethylene carbonate):EMC (ethyl methyl carbonate):DEC (Diethyl carbonate) were mixed in a volume ratio of about 1:1:1 and used. And as a counter electrode, Li metal was used and $LiPF_6$ was dissolved in the electrolyte so as to prepare coin cell type half battery. The charge/discharge property and cyclability of the battery was examined at a voltage of about 0.01 to about 3.0 V and a current density of about 50 mA/g, and the result was shown in FIG. 18.

Comparative Example 6

Using the iron oxide nanoparticles of Comparative Example 3 instead of Comparative Example 1, a battery was prepared according to the same manner as in Comparative Example 5, and the charge/discharge property and cyclability of the battery was examined at a voltage of about 0.01 to about 3.0 V and a current density of about 50 mA/g. The result was shown in FIG. 19a. Furthermore, the charge/discharge property and cyclability of the battery at a high rate was examined while changing the current density from about 50 mA/g to about 50,000 mA/g, and the result was shown in FIG. 19b.

Comparative Example 7

Using the tin oxide nanoparticles of Comparative Example 4 instead of Comparative Example 1, a battery was prepared according to the same manner as in Comparative Example 5, and the charge/discharge property and cyclability of the battery was examined at a voltage of about 0.01 to about 3.0 V and a current density of about 50 mA/g. The result was shown in FIG. 20a. Furthermore, the charge/discharge property and cyclability of the battery at a high rate was examined while changing the current density from about 50 mA/g to about 5,000 mA/g, and the result was shown in FIG. 20b.

Figure 18:
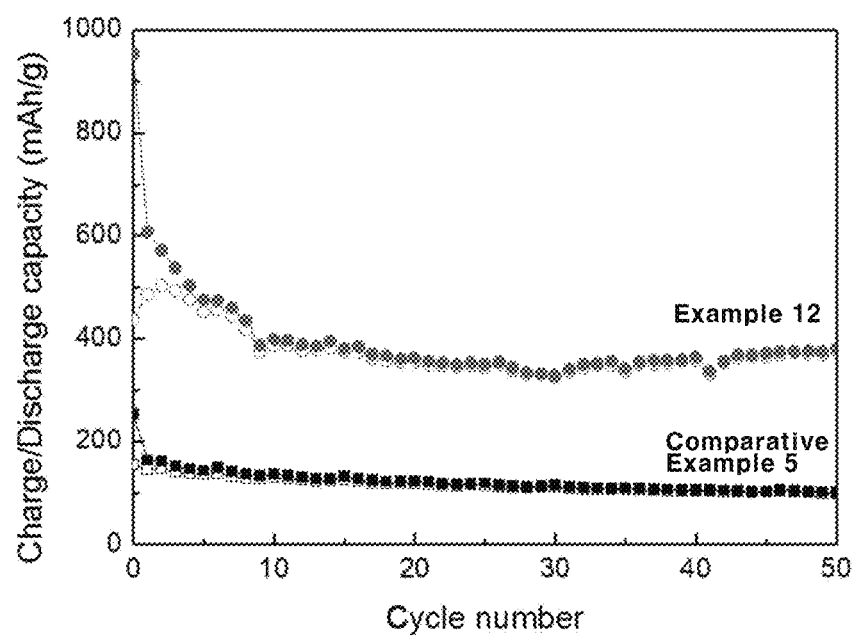
FIG. 18 shows a graph describing charge/discharge characteristics of a battery prepared by Example 12 and a battery prepared by Comparative Example 5 and describing high rate capacities.

As illustrated in FIG. 18, in the case of the titanium dioxide/graphene electrode prepared by Example 12, the discharge capacity of the lithium ions was about 378 mAh/g at a current density of about 50 mA/g after 50 cycles, which is far more excellent than the discharge capacity of the titanium dioxide electrode prepared by Comparative Example 5 which was about 99 mAh/g after 50 cycles.

Figure 19:
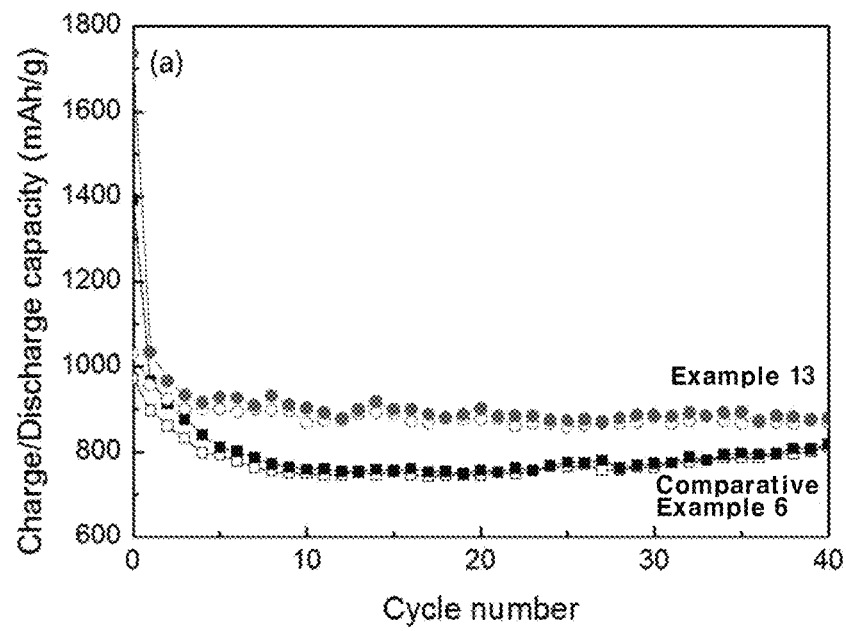
FIG. 19 shows a graph describing charge/discharge characteristics of a battery prepared by Example 13 and a battery prepared by Comparative Example 6 and a graph describing high rate capacities.
Figure 19:
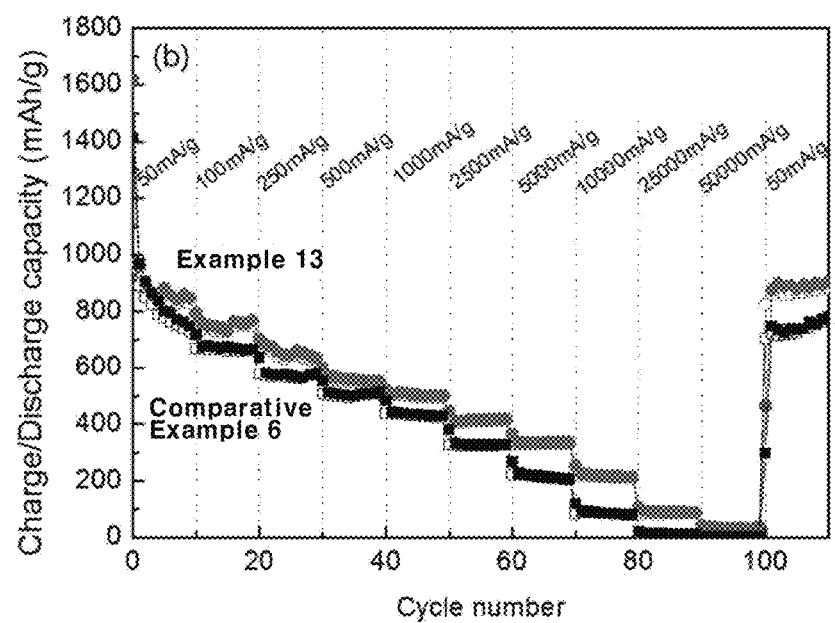

As illustrated in FIG. 19a, in the case of the iron oxide/graphene electrode prepared according to Example 13, the discharge capacity of the lithium ion was about 878 mAh/g at a current density of about 50 mA/g after 40 cycles, which is more excellent than the discharge capacity of the iron oxide electrode prepared by Comparative Example 6 which was about 812 mAh/g after 40 cycles. Furthermore, as illustrated in FIG. 19b, it can be shown that the discharge capacity of the iron oxide/graphene electrode measured while increasing the current density from about 50 mA/g to about 50,000 mA/g was more excellent than the discharge capacity of the iron oxide electrode.

Figure 20:
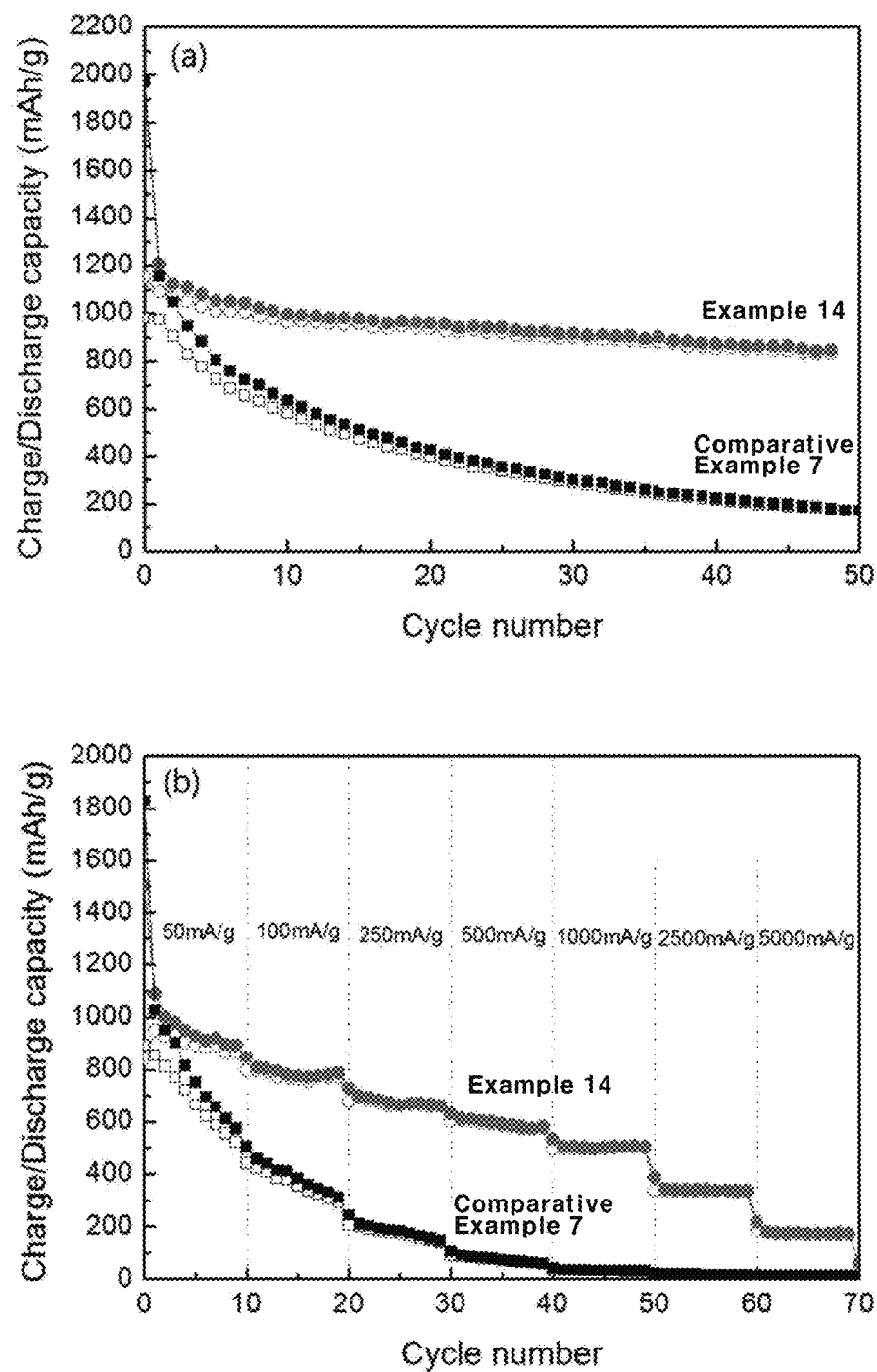
FIG. 20 shows a graph describing charge/discharge characteristics of a battery prepared by Example 14 and a battery prepared by Comparative Example 7 and a graph describing high rate capacities.

As illustrated in FIG. 20a, it can be seen that the discharge capacity of the lithium ion in the case of the tin oxide/graphene electrode prepared by Example 14 was about 834 mAh/g at a current density of about 50 mA/g after 50 cycles, which is far more excellent than the discharge capacity of the tin oxide electrode prepared by Comparative Example 7 which was about 168 mAh/g after 50 cycles. Furthermore, as illustrated in FIG. 20b, it can be seen that the discharge capacity of the tin oxide/graphene electrode measured while increasing the current density from about 50 mA/g to about 5,000 mA/g is far more excellent than the discharge capacity of the tin oxide electrode. It is considered that the reason why the metal oxide/graphene electrode has more excellent lithium ion charge/discharge characteristics than the metal oxide electrode is because of the increased transport kinetics of the electrons and lithium ions due to the high electrical conductivity that is an inherent quality of the graphene, and further, because the graphene serves as a buffer to solve the problem of deterioration of the charge/discharge characteristics caused by the volume change that inevitably accompanies when the metal oxide receives the lithium ions by an alloy or conversion reaction.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be exemplary but not limiting the present invention in any way.

What is claimed is:

1. A method for preparing a metal oxide nanoparticle/graphene composite using a supercritical fluid, comprising:
preparing a dispersed solution by dispersing graphene oxide and a metal oxide precursor in an organic solvent; and
forming the metal oxide nanoparticle/graphene composite by reacting the dispersed solution under a condition supercritical for the organic solvent, wherein the organic solvent is an alcohol solvent.

2. The method according to claim 1,
wherein the metal oxide precursor is a metal salt.

3. The method according to claim 2,
wherein the metal salt includes at least one of metal isopropoxide, chloride, acetate, nitrate, acetylacetonate, methoxide, ethoxide, tetraethoxide, butoxide, and sulfide in which the metal includes titanium (Ti), aluminum (Al), silicon (Si), tin (Sn), iron (Fe), copper (Cu), manganese (Mn), cobalt (Co), zinc (Zn), vanadium (V), molybdenum (Mo), platinum (Pt), gold (Au), silver (Ag), nickel (Ni), magnesium (Mg), chrome (Cr), tungsten (W), indium (In), lead (Pb), or a combination thereof.

4. The method according to claim 1,
wherein the alcohol solvent includes methanol, ethanol, propanol, isopropylalcohol, butanol, isobutanol, 2-butanol, tert-butanol, n-pentanol, isopentylalcohol, 2-methyl-1-butanol, neopentyl alcohol, diethylmethanol, methylpropylmethanol, methylisopropylmethanol, dimethylethylmethanol, 1-hexanol, 2-hexanol, 3-hexanol, 2-methyl-1-pentanol, 3-methyl-1-pentanol, 4-methyl-1-pentanol, 2-methyl-2-pentanol, 3-methyl-2-pentanol, 4-methyl-2-pentanol, 2-methyl-3-pentanol, 3-methyl-3-pentanol, 2,2-dimethyl-1-butanol, 2,3-dimethyl-1-butanol, 2,3-dimethyl-2-butanol, 3,3-dimethyl-1-butanol, 2-ethyl-1-butanol, 1-heptanol, 2-heptanol, 3-heptanol, 4-heptanol, or a combination thereof.

5. The method according to claim 1,
wherein the amount of graphene oxide is about 0.1 to about 1,000 g per 1 L of the dispersed solution.

6. The method according to claim 1,
wherein a weight ratio of the graphene oxide to the metal oxide precursor is about 1:0.01 to about 1:5.

7. The method according to claim 1,
wherein at the forming the metal oxide nanoparticle/graphene composite, the dispersed solution is reacted under a supercritical condition of a temperature of about 100 to about 600 C ° and a pressure of about 20 to about 600 bar.

8. The method according to claim 1,
wherein the metal oxide nanoparticle/graphene composite is formed by a reaction of about 10 seconds to about 6 hours.

9. The method according to claim 1,
wherein the metal oxide nanoparticle/graphene composite is prepared by a one-pot reaction.

10. The method according to claim 1,
wherein metal oxide nanoparticles of the metal oxide nanoparticle/graphene composite have an average particle size of about 1 to about 50 nm.

11. The method according to claim 1,
wherein the graphene oxide and the metal oxide precursor are ultrasonicated together in the organic solvent to prepare the dispersed solution.

12. The method according to claim 1,
wherein the dispersed solution comprises 75 mg/L to 1,250 mg/L of the metal oxide precursor in the organic solvent.

* * * * *